RING COUNTER
Filed Dec. 20, 1956
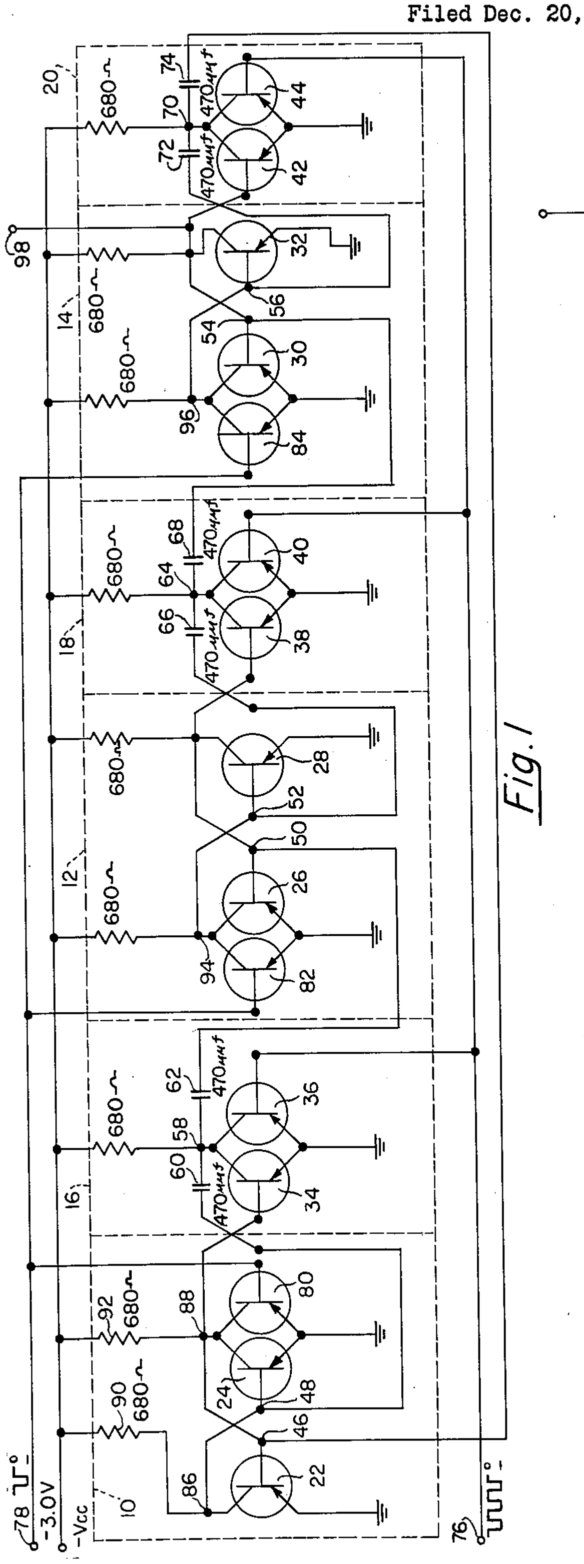
Fig. 1
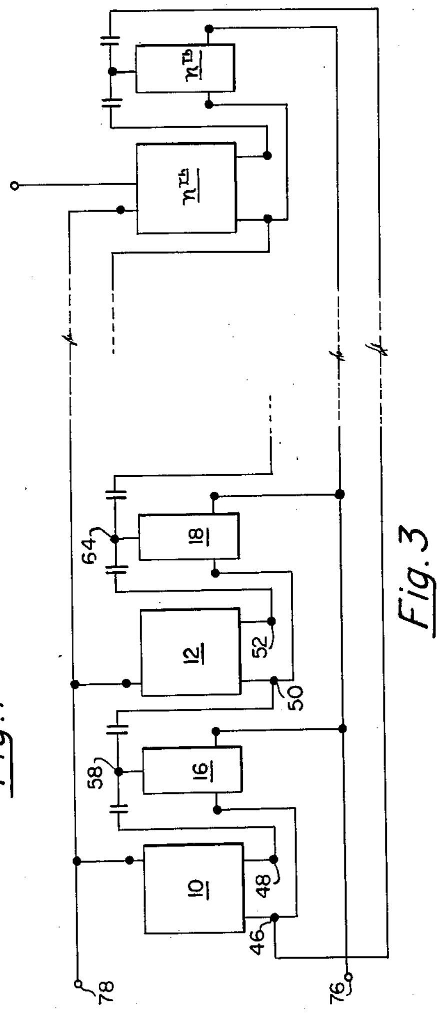
Fig. 3
Fig. 2
| | 0 | 1ST | 2ND | 3RD |
|---|---|---|---|---|
| 10, | 1 | 0 | 0 | 1 |
| 12, | 0 | 1 | 0 | 0 |
| 14, | 0 | 0 | 1 | 0 |
INVENTOR.
EDWARD GARY CLARK
BY Edward W Hughes
ATTORNEY.

United States Patent Office 2,973,438

Patented Feb. 28, 1961

2,973,438

RING COUNTER

Edward Gary Clark, Oreland, Pa., assignor to Burroughs Corporation, Detroit, Mich., a corporation of Michigan Filed Dec. 20, 1956, Ser. No. 629,737

3 Claims. (Cl. 307—88.5)

This invention relates to counters, and more particularly to an improved ring counter.

A ring counter may be defined as a loop of interconnected bistable devices such that one and only one of said devices is in a specified state at any given time and such that as input signals are counted, the position of the one specified state moves in an ordered sequence around the loop.

A bistable device is a device having two stable states and two input terminals (or types of input signals), each of which corresponds with one of the two states. A bistable device will remain in either state until caused to change to the other state by the application of the corresponding signal. It is customary to denote one of the states of the bistable device as 0 and the other as 1. In a ring counter circuit, means are usually provided to place one bistable element of the counter in the 1 state, for example, and the remaining bistable devices in their other, or 0, state.

The means for interconnecting the bistable devices of the ring counter described and claimed herein are conditional steering gates such as those described in my copending application entitled "Complementing Flip-flops," Ser. No. 629,570, filed December 20, 1956. Such a gate, when interconnecting two bistable devices, may be connected to the preceding device so that when the preceding device is in the 0 state, the gate is disabled and will not produce an output signal when an input signal, or advance pulse, is applied to the gate. When the preceding bistable device is in the 1 state, the gate will be enabled and will produce an output signal when an advance pulse is applied to the gate which will cause the preceding device to change to the 0 state and the succeeding device to change to the 1 state. If an enabled gate does not cause the preceding state to change from the 1 to the 0 state, a ring counter of *n* stages will fill up with 1's, or all the binary elements will change to the 1 state, after *n* advance pulses have been applied to the counter; and the ring counter will be able to count only the first *n* advance pulses applied to it unless means are provided to reset all the bistable devices to the 0 state, except the first, on the *n*th pulse.

In prior-art ring counters using gating circuits to interconnect the bistable devices, it has been necessary to limit the width, or period of time each advance pulse is present, or applied, to the ring counter. Otherwise, if during the period of time an advance pulse is applied, the first bistable device shifts from the 1 to the 0 state, and the next succeeding device changes from the 0 to the 1 state, the gating means between the second and third bistable devices will change condition and cause the third bistable device to shift to the 1 state, etc. The final position of the 1 state in the ring counter under these circumstances will be determined by the width of each advance pulse rather than by the number of advance pulses.

This problem has heretofore been solved by incorporating means to delay the change of condition of the gating means and by limiting the pulse widths of the advance pulses so that they are equal to or less than the delay provided. The restriction of advance pulse width may be provided by pulse standardizers. As a result, the maximum pulse repetition frequency of the input signals of a ring counter having delay means incorporated therein is substantially less than the maximum pulse repetition frequency of the individual bistable elements and gates used to form a counter.

Conditional steering gates are provided with means which inhibit them from becoming enabled during the period of time an advance pulse is present. Thus the change of a steering gate from its disabled condition to its enabled condition is conditioned upon the removal of the advance pulse. When conditional steering gates are used in a ring counter, it is no longer necessary to limit the width of each advance pulse. Also there is no need to provide internal delay circuits, which delay the change of condition of each gate of a counter, or to incorporate a pulse standardizer circuit in each counter. As a result, the maximum operating frequency of a ring counter having conditional steering gates is substantially the maximum pulse repetition frequency of the bistable devices. Since the width of the advance pulses is no longer a determining factor in the operation of a ring counter, ring counters with conditional steering gates will operate with advance pulses, the width of which may be of indefinite duration, or a change of D.C. level.

It is, therefore, an object of this invention to provide an improved ring counter.

It is a further object of this invention to provide a ring counter using conditional steering gates between the bistable devices of the counter.

It is a still further object of this invention to provide an improved ring counter in which the change of the steering gates from their disabled condition to their enabled condition is conditioned upon the removal of each input, or advance, pulse.

It is another object of this invention to provide a ring counter, the maximum pulse repetition rate of which is substantially independent of the steering means.

It is still another object of this invention to provide a ring counter in which the width of each advance pulse may be of any duration, or period.

It is a still further object of this invention to provide an improved ring counter in which the width of each advance pulse in excess of that necessary to trigger the ring counter is not a factor in the proper operation of the ring counter.

Other objects and many of the attendant advantages of this invention will be readily appreciated as the same become better understood by reference to the following detailed description when considered in connection with the accompanying drawing.

Fig. 1 is a schematic diagram of a three-stage ring counter;

Fig. 2 is a schematic diagram describing the operation of the counter of Fig. 1; and Fig. 3 is a block diagram of a ring counter of *n* stages.

In Fig. 1 a three-stage ring counter is illustrated. The counter consists of three bistable devices, 10, 12, and 14, and three steering and inhibit gates, 16, 18, and 20, which interconnect adjacent bistable devices. Bistable device 10 consists of transistors 22, 24, which are cross coupled to form a direct-coupled saturation flip-flop; bistable device 12 consists of transistors 26, 28, which are cross coupled to form a second direct-coupled saturation flip-flop; and bistable device 14 consists of transistors 30, 32, which are also cross coupled to form the third direct-coupled saturation flip-flop. Conditional steering gate 16 consists of transistors 34, 36, which are connected in parallel; gate 18 consists of transistors 38, 40, which are connected in parallel, and gate 20 consists of transistors 42, 44, which are connected in parallel.

Each of bistable devices 10, 12, 14 is provided with two input terminals. The input terminals of bistable device 10 are terminals 46, 48, which are directly connected to the collectors of transistors 24, 22, respectively. The input terminals of bistable device 12 are terminals 50, 52, which are directly connected to the collectors of transistors 28, 26, respectively; and the input terminals of bistable device 14 are terminals 54, 56, which are directly connected to the collectors of transistors 32, 30, respectively. Terminal 58, which is connected to the collectors of transistors 34, 36 of gate 16, is connected by capacitor 60 to input terminal 48 of bistable device 10 and by capacitor 62 to input terminal 50 of bistable device 12. Terminal 64, which is connected to the collectors of transistors 38, 40 of gate 18, is connected by capacitor 66 to input terminal 52 of bistable device 12 and by capacitor 68 to input terminal 54 of bistable device 14. Similarly terminal 70, which is connected to the collectors of transistors 42, 44 of gate 20, is connected by capacitor 72 to input terminal 56 of bistable device 14 and by capacitor 74 to input terminal 46 of bistable device 10.

From a perusal of Fig. 1, it can be seen that each of the steering and inhibit gates 16, 18, 20 has a D.C. connection between the base of one of its transistors, for example, transistor 34 of gate 16, and the first input terminal of the bistable device preceding it, input terminal 46 of bistable device 10. It is also apparent that there is an A.C. coupling between the collectors of the transistors of each steering gate and the second input terminal of the preceding bistable device, and the first input terminal of the succeeding bistable device; for example, between terminal 58 of gate 16 and input terminal 48 of device 10 and input terminal 50 of device 12. The bases of transistors 36, 40, 44 of gates 16, 18, 20 are connected to advance, or input, terminal 76 of the ring counter.

As stated previously, it is normally necessary to provide a circuit to place the ring counter in what may be defined as its initial condition. The circuit means illustrated in Fig. 1 for doing this includes set terminal 78 and set transistors 80, 82, 84. Transistor 80 is connected in parallel with transistor 24 of flip-flop 10, transistor 82 is connected in parallel with transistor 26 of flip-flop 12, and transistor 84 is connected in parallel with transistor 30 of flip-flop 14. The bases of set transistors 80, 82, 84 are connected to set terminal 78.

It is possible to design circuits using p-n-p junction transistors of the alloy, grown, or surface barrier types in the common emitter configuration so that transistors of such circuits will saturate, or bottom, if the potentials of their bases with respect to their emitters, which are generally at ground potential, are more negative than −0.3 v. and so that the transistors will be substantially biased off if the potentials of the bases with respect to their emitters are approximately −0.1 v., or more positive. These voltages obviously may vary to some extent depending on the characteristics of the transistors used, as is well known in the art. In such circuits the potential of the collector of a bottomed transistor will be approximately −0.1 v., or approximately ground potential, which potential when applied to the base of a transistor in a similar configuration, is sufficient to cut off the transistor. The devices described and illustrated as examples of embodiments of the invention use transistor circuits having substantially such operating characteristics.

In order to simplify the explanation of the operation of the ring counter, the operation of a single flip-flop such as flip-flop 10 and the operation of a steering gate such as gate 16 will be made in greater detail. The operation of flip-flops 12 and 14 will be substantially the same as that of flip-flop 10, and the operation of steering gates 18 and 20 will be substantially the same as that of gate 16. If it is assumed initially that transistor 22 is cut off, then the potential of collector 86 of transistor 22 will be at some negative potential. This negative potential, which is applied to the base of transistor 24, causes transistor 24 to bottom so that the potential of its collector 88 is substantially at ground potenial. The potential of collector 86 of transistor 22 is determined by the magnitude of the collector supply source Vcc, which is not illustrated, and the voltage drop across load resistor 90 due to the base current drawn by transistor 24.

When a positive pulse of sufficient amplitude is applied to input terminal 48 of flip-flop 10, the potential of the base of transistor 24 will be made more positive, raising it to approximately ground level, which cuts off transistor 24. This causes the potential of collector 88 of transistor 24 to become negative. This negative potential, which is applied to the base of transistor 22, causes transistor 22 to bottom. Collector 86 of transistor 22 becomes more positive, substantially reaching ground potential, which is sufficient to maintain transistor 24 cut off. The magnitude of the potential of collector 88 of transistor 24 is determined by Vcc and the potential drop across load resistor 92 due to the base current drawn by transistor 22 and transistor 34. The application of a positive going pulse with sufficient amplitude to input terminal 46 will cause transistor 22 to cut off and return flip-flop 10 to its initial state with transistor 22 cut off and transistor 24 bottomed, or saturated.

With respect to gate 16, the base of transistor 34 is connected to collector 88 of transistor 24 and to input terminal 46 of the preceding flip-flop 10. The base of transistor 36 is connected to advance terminal 76 of the ring counter. In the initial condition of flip-flop 10 with transistor 22 cut off and transistor 24 bottomed, transistor 34 will also be cut off since its base is also substantially at ground potential. In the absence of an advance pulse, terminal 76 is substantially at ground level, and thus the base of transistor 36 will be at ground potential and transistor 36 will be cut off. When transistors 34, 36 are both cut off, the potential of terminal 58 will be at a negative potential substantially equal to Vcc. When conditional steering gate 16 is in this condition, it is defined as being enabled. When a negative going advance pulse of sufficient amplitude is applied to terminal 76, it will cause transistor 36 to bottom. This causes the potential of terminal 58 to suddenly increase and to produce a positive going pulse. This pulse is coupled through capacitors 60, 62 to bistable devices 10, 12, which are interconnected by gate 16.

When flip-flop 10 is in its other state with transistor 22 bottomed, the potential of input terminal 46 of bistable device 10 is negative and the base of transistor 34 of gate 16 will be negative. Transistor 34 will bottom and the potential of terminal 58 will be substantially at ground potential, even though transistor 36 is cut off, because advance terminal 76 is at ground potential in the absence of an advance pulse. The application of a negative going advance pulse to terminal 76 will produce substantially no change in the potential of terminal 58 since it is already substantially at ground potential. When the potential of terminal 58 is substantially at ground potential, the condition of gate 16 is defined as being disabled.

As previously described, it is essential to place bistable devices 10, 12, 14 in prescribed states. When a negative pulse is applied to set terminal 78, set transistors 80, 82, 84 bottom while the pulse is present. This causes bistable device 10 to assume the stable state in which terminal 88 is at ground potential and terminal 86 is at a negative potential; it places bistable device 12 in the stable state in which terminal 94 is at ground potential and the collector of transistor 28 is at a negative potential; and bistable device 14 is placed in the stable state in which terminal 96 is substantially at ground potential and the potential of the collector of transistor 32 is at a negative potential.

If the state of bistable device 10, in which the potential of terminal 86 is negative, is denoted 1, then the states of bistable devices 12, 14, in which terminals 94, 96 are substantially at ground potential, may be denoted 0. The states of flip-flops 10, 12, 14 after a set pulse has been applied to terminal 78 are described by the first column of the chart constituting Fig. 2.

When bistable device 10 is in the 1 state, gate 16 will be enabled, and when bistable devices 12, 14 are in the 0 state, gates 18, 20 will be disabled. When the first advance pulse is applied to terminal 76 after the counter has been placed in its initial condition and the set pulse has terminated, this first pulse is also applied to the bases of transistors 36, 40, 44 of gates 16, 18, 20. Disabled gates 18, 20 produce substantially no output signal when the first advance pulse is applied to terminal 76. The application of the first advance pulse to enabled gate 16, however, causes the potential of terminal 58 to increase; i.e., become more positive, and a positive going pulse is coupled through capacitor 60 to input terminal 48 of bistable device 10 and a positive going pulse is coupled through capacitor 62 to input terminal 50 of bistable device 12. The positive pulse applied to terminal 48 causes bistable device 10 to change to its 0 state; and the positive pulse applied to terminal 50 causes bistable device 12 to change to its 1 state.

When bistable device 10 has changed to the 0 state, input terminal 46 is at a negative potential, and this negative potential is applied to the base of transistor 34 of gate 16 so that transistor 34 bottoms. However, since transistor 36 is bottomed while the advance pulse is present, the change of state of flip-flop 10 has no effect on gate 16. Similarly when bistable device 12 changes from the 0 to the 1 state, the potential of its input terminal 50 changes to approximately ground potential, which cuts off transistor 38. However, for the duration of the period of time the advance pulse is applied to advance terminal 76, the potential of terminal 64 of gate 18 is maintained at substantially ground potential by bottomed transistor 40. Thus during the period of time the advance pulse is present, gate 18 is prevented, or inhibited, from changing from its disabled condition to its enabled condition, even though bistable device 12 has changed to the 1 state. The first advance pulses produce no change in bistable device 14 or in gate 20.

When the first advance pulse terminates, the steering gates are released to the control of the bistable device to which they have a D.C. connection; i.e., the device preceding each gate. Gate 16 will be disabled since the base of transistor 34 will be at a negative potential, gate 18 will be enabled since the base of transistor 38 will be at ground potential, and gate 20 will remain disabled. The state of the bisacle devices of the ring counter at the end of the first advance pulse is described by the second column of Fig. 2.

At the termination of the first advance pulse, the potential of terminal 64 of gate 18 changes from substantially ground potential to a negative potential substantially equal to *Vcc*. This change, or negative going pulse, is coupled through capacitor 66 to input terminal 52 of device 12, and through capacitor 68 to input terminal 54 of device 14. However, at this time device 12 is in the 1 state and device 14 is in the 0 state, so that terminals 52, 54 are at a negative potential. The application of a negative going pulse to these terminals under these circumstances will not cause devices 12, 14 to change state.

When the second advance pulse is applied to advance terminal 76, transistors 36, 44 of disabled gates 16, 20 bottom, but the disabled gates do not produce an output signal for the reasons described previously. The second advance pulse causes enabled gate 18 to produce a positive going pulse. The pulse is coupled through capacitor 66 to input terminal 52 of bistable device 12, which causes bistable device 12 to change to the 0 state; and the other positive going pulse is applied to input terminal 54 of bistable device 14, which causes flip-flop 14 to change to the 1 state. Gate 20 is prevented from becoming enabled until the second advance pulse terminates by means of bottomed transistor 44. When the second advance pulse terminates, gate 20 becomes enabled since the base of transistor 42 will be at ground potential due to its connection to terminal 54 of bistable device 14. Gates 16 and 18 are disabled after the termination of the second advance pulse. The states of the bistable devices of the ring counter at the termination of the second advance pulse are described by the third column of Fig. 2.

When the third advance pulse is applied to terminal 76, disabled gates 16, 18 produce no output signal. Enabled gate 20 produces a positive pulse, which is applied through capacitor 72 to input terminal 56 and causes flip-flop 14 to change to the 0 state. This positive pulse is also coupled through capacitor 74 to input terminal 46 of bistable device 10, which causes bistable device 10 to change to the 1 state. Conditional steering gate 16 is prevented from changing from its disabled state to its enabled state for the duration of the pulse by bottomed transistor 36. When the third advance pulse terminates, gate 16 becomes enabled since the base of transistor 34 is connected to input terminal 46 of bistable device 10, which is substantially at ground potential. Gates 18 and 20 are disabled. The conditions of the bistable devices after the termination of the third advance pulse are described by the fourth column of Fig. 2.

If it is desired to obtain an output signal at the end of every third advance pulse applied to terminal 76, the output signal may be obtained at terminal 98, which is connected to the collector of transistor 32, and input terminal 54 of flip-flop 14.

Fig. 3 is a block diagram of a ring counter of $n$ stages where $n$ may be any integer greater than 1. In Fig. 3 the reference numerals correspond to those which identify similar elements of the ring counter illustrated in Fig. 1. From the foregoing it is clear that the number of stages comprising a ring counter is a matter of choice.

In the embodiment illustrated the transistors are SB–100's. As is well known in the art, n-p-n transistors may be substituted for p-n-p transistors provided that the polarities of the supply voltages and the polarities of the triggering signals are reversed.

The values and/or types of components and the voltages appearing on the drawings are included by way of example only as being suitable for the device illustrated. It is to be understood that the circuit specifications in accordance with the invention may vary with the design for any particular application.

Obviously many modifications and variations of the present invention are possible in the light of the above teachings. It is, therefore, to be understood that within the scope of the appended claims the invention may be practiced other than as specifically described and illustrated.

What is claimed is:

1. A ring counter comprising $n$ transistor bistable devices; each of said devices having two states denoted 0 and 1; $n$ transistor steering gates; where $n$ is an integer greater than 1; each of said gates having two conditions, an enabled condition and a disabled condition; an advance terminal adapted to receive advance pulses applied thereto; said advance pulses being sequentially spaced in time; first circuit means connecting the advance terminal to each of said gates; a second circuit means connecting each of said gates between different pairs of said transistor bistable devices; means for setting said transistor bistable devices so that the first transistor bistable device is in the 1 state and the remainder are in the 0 state; each transistor gate being enabled when the bistable device preceding it is in the 1 state and being disabled when the bistable device preceding it is in the 0 state; each of said transistor gates when enabled and when an advance pulse is applied thereto producing an output signal; the output signal produced by an enabled gate causing the preceding transistor bistable device to shift to the 0 state and the succeeding transistor bistable device to shift to the 1 state; means responsive to each advance pulse for disabling all said transistor steering gates during the period of time an advance pulse is applied to the advance input terminal, and output means electrically connected with the *n*'th transistor bistable device for obtaining an output signal from the *n*'th transistor bistable device, whereby said ring counter produces an output signal for every *n*'th advance pulse applied to the advance terminal.

2. A ring counter comprising *n* flip-flops and *n* conditional steering gates, where *n* is an integer greater than 1, first circuit means connecting each gate between a different pair of flip-flops, with one flip-flop of each pair preceding the gate and the other flip-flop succeeding it, each of said flip-flops comprising a first and a second transistor cross-coupled to form a direct current saturation flip-flop, each of said conditional steering gates comprising a pair of transistors connected in parallel, an advance terminal adapted to receive advance pulses applied thereto, and connected with the base of one of the transistors of each gate, second circuit means connecting the base of the other transistor of each gate to the collector of one of the transistors of the preceding flip-flop, first capacitor means connecting the collectors of the transistors of each gate to the collector of the other transistor of the preceding flip-flop, second capacitor means connecting the collectors of the transistors of each gate to the collector of one of the transistors of the succeeding flip-flop, a set terminal, a first set transistor connected in parallel with the second transistor of one of the flip-flops, and additional set transistors connected in parallel with the first transistor of each of the other flip-flops, and third circuit means connecting the bases of the set transistors to the set terminal.

3. A ring counter comprising *n* flip-flops and *n* conditional steering gates, where *n* is an integer greater than 1, first circuit means connecting each of said gates between a different pair of flip-flops, with one flip-flop of each pair preceding the gate and the other flip-flop succeeding it, each of said flip-flops comprising a first and a second transistor, cross-coupled to form a direct current saturation flip-flop, each of said conditional steering gates comprising a pair of transistors connected in parallel, an advance terminal adapted to receive advance pulses applied thereto, and connected with the base of one of the transistors of each gate, second circuit means connecting the base of the other transistor of each gate to the collector of the second transistor of the preceding flip-flop, a first capacitor means connecting the collectors of the transistors of each gate to the collector of the first transistor of the preceding flip-flop, a second capacitor means connecting the collectors of the transistors of each gate to the collector of the second transistor of the succeeding flip-flop, a set terminal, a first set transistor connected in parallel with the second transistor of one of the flip-flops, and ($n-1$) set transistors connected in parallel with the first transistor of the remaining flip-flops, and third circuit means connecting the bases of the said first and said ($n-1$) set transistors to the set terminal.

References Cited in the file of this patent

UNITED STATES PATENTS

| | | |
|---|---|---|
| 2,404,047 | Flory et al. | July 16, 1946 |
| 2,409,689 | Morton et al. | Oct. 22, 1946 |
| 2,445,215 | Flory | July 13, 1948 |
| 2,715,678 | Barney | Aug. 16, 1955 |
| 2,764,343 | Diener | Sept. 25, 1956 |
| 2,846,594 | Pankratz | Aug. 5, 1958 |
| 2,848,608 | Nienburg | Aug. 19, 1958 |

OTHER REFERENCES

Electronics, June 1955, pp. 132–136, "Directly Coupled Transistor Circuits," by Beter et al., page 133.

Arithmetic Operations in Digital Computers, by Richards, copyright 1955, page 206, Figure 7–13C.